United States Patent [19]

Asai et al.

[11] Patent Number: 5,122,197
[45] Date of Patent: Jun. 16, 1992

[54] METHOD OF PRODUCING CAST-IRON PRODUCT

[75] Inventors: Hiroshi Asai; Ichiro Kitayama, both of Hakkaichi; Kouji Mineshita, Hiroshima; Ken Okazaki, Higashi-Hiroshima; Akira Ohtsuka, Higashi-Hiroshima; Yuichi Nishiyama, Hiroshima; Yasuo Uosaki, Hiroshima, all of Japan

[73] Assignee: Mazda Motor Corporation, Hiroshima, Japan

[21] Appl. No.: 573,565

[22] Filed: Aug. 28, 1990

[30] Foreign Application Priority Data

Aug. 30, 1989 [JP] Japan ................... 1-225949
Aug. 30, 1989 [JP] Japan ................... 1-225950

[51] Int. Cl.$^5$ ........................... C21D 5/00
[52] U.S. Cl. ..................... 148/543; 148/612
[58] Field of Search ............. 148/321, 138, 3; 420/15

[56] References Cited

FOREIGN PATENT DOCUMENTS 3139973  4/1983  Fed. Rep. of Germany ........ 420/15
53-137814 12/1978  Japan ....................... 148/321
56-42663 10/1981  Japan .
60-125310  7/1985  Japan ....................... 148/138

Primary Examiner—Deborah Yee
Attorney, Agent, or Firm—Fleit, Jacobson, Cohn, Price, Holman & Stern

[57] ABSTRACT

A cast-iron product has a composition of 4.3–4.9 wt. % Carbon Equivalent (CE), 0.25–0.5 wt. % Chromium (Cr), 0.05–0.12 wt. % Tin (Sn), 0.4–1.2 wt. % Manganese (Mn), 0–0.1 wt. % Phosphorus (P), and 0–0.15 wt. % Sulfur (S), with the balance being Iron (Fe). A brake assembly comprises a sliding element made of such a cast iron, and the sliding element is adapted to slideably contact with a friction element or elements made of non-asbestos material and constitute the assembly. Further, a method of producing a cast iron product comprises the steps of casting a cast iron having a composition of 4.3–4.9 wt. % Carbon Equivalent (CE), 0.25–0.5 wt. % Chromium (Cr), 0.05–0.12 wt. % Tin (Sn), 0.4–1.2 wt. % Manganese (Mn), 0–0.1 wt. % Phosphorus (P), and 0–0.15 wt. % Sulfur (S), with the balance being Iron (Fe), releasing a mold at a temperature not less than $A_1$ allotropic transformation temperature, and cooling the cast iron at a relatively high cooling rate.

9 Claims, 4 Drawing Sheets

METHOD OF PRODUCING CAST-IRON PRODUCT

BACKGROUND OF THE INVENTION

This invention relates to a cast-iron product having high damping capacity for use in a brake disc, a brake drum and so forth, and a method of producing such a cast-iron product.

In recent years, attempts have been made to reduce an undesirable brake noise occurring upon the braking of a vehicle. This is an important technical problem, and solving of this problem would lead to an improvement in, and riding comfort of drivers and passengers.

One approach for reducing the brake noise is to redesign the whole construction of the brake system so that the rigidity of materials is so changed as to have the resonant frequency shifted. This method might contribute to a reduction in brake noise in a relatively low range of vibration frequency. However, in this approach, it is difficult to obtain a sufficient reduction in brake noise in a range of high frequency, i.e., above 4 Hz.

Lately, brake discs or brake drums tend to be made of cast iron, which has a relatively excellent vibration damping capacity. It is a known fact that the damping capacity of cast iron is generally enhanced as the carbon equivalent (CE) represented by the following formula is increased;

$$CE = \% C + \frac{\% Si}{3}.$$

Cast iron which is made by the application of this fact has been already proposed by Japanese Patent Publication No. 56-42663, the Patent of which was issued to Mitsubishi Heavy Industry Co., Ltd. On the other hand, it is also a known fact that a higher carbon equivalent in cast iron leads to lower strength and hardness of the cast iron.

In the Patent issued to Mitsubishi Heavy Industry Co., Ltd., the cast iron contains alloying elements such as Chromium (Cr) and Zirconium (Zr), which are added to the cast iron and are intended to improve the strength and hardness thereof. However, under circumstances in which increments of engine power output and higher quality of parts or assemblies in the whole vehicle structure are desired, it has been found that the above cast iron is not sufficient to provide brake parts having a performance ability or quality equal to or greater than the other parts and assemblies of the vehicle.

Another alloying element such as Antimony (Sb) might be added to the cast iron. Such a cast iron, however, would generate undesirable gases such as $SbO_3$ and, therefore, the same could not be practically used at the present stage.

A brake assembly in use for a braking system of a vehicle comprises, in general, a sliding element referred to as a brake disc or a brake drum, and a friction element, such as a brake pad or a brake shoe which is brought into sliding contact with the sliding element. In order to reduce the brake noise, it is required not only to pay attention to enhancement of the damping capacity of the sliding element, but also to be careful about what kind of combination of the sliding element and the friction element is adequate.

In a case where asbestos is used for the friction element, the friction element has excellent braking characteristics, as well as characteristics desired for noise elimination regardless of the materials of the sliding element. For this reason, friction elements made of asbestos have been used for many years. Asbestos, however, has been recently found to be a material which might negatively affect human health, when in the form of dust. To prevent such environmental pollution, friction elements are required to be made of non-asbestos materials. In response to this requirement, there has been a tendency for friction elements to be made of non-asbestos materials, such as a ceramic material containing a predetermined amount of steel fibers.

In a case where such a friction element is made of any semi-metallic material containing steel fibres, the coefficient of friction between the friction element and the rubbing surface of the brake disc or drum has been found to be greater than the case where the friction element is made of asbestos. In addition, the coefficient of friction has been found to increase as the rotational speed of a wheel decreases. As can be inferred from these facts, such a semi-metallic element results in the frequent occurrence of brake noise.

Taking such facts into consideration, it has been deduced that, in a case where any semi-metallic material is to be used as the friction element, it is better for the brake disc or drum to be made of any material possessing a higher vibration damping capacity.

SUMMARY OF THE INVENTION

An object of the present invention is to provide a cast-iron product possessing an excellent vibration damping capacity as well as high strength and wear-resistance.

Another object of the present invention is to provide a brake assembly not only having the coefficient of friction sufficient to ensure an appropriate braking force, but also having excellent vibration damping characteristics.

Still another object of the present invention is to provide a method of efficiently producing a cast-iron product possessing an excellent vibration damping capacity.

We have discovered that cast irons of high vibration damping capacity can be obtained by including both the appropriate amounts of Cr and Sn in cast irons, and that brake discs or drums made of such cast irons and possessing high damping capacities can be incorporated into brake assemblies provided with semi-metallic friction elements so that frequent occurrence of brake noise can be prevented.

According to the present invention, there is provided a cast-iron product having a composition comprising:
Carbon Equivalent (CE): 4.3–4.9 percent by weight
Chromium (Cr): 0.25–0.5 percent by weight
Tin (Sn): 0.05–0.12 percent by weight
Manganese (Mn): 0.4–1.2 percent by weight
Phosphorus (P): 0–0.1 percent by weight
Sulfur (S): 0–0.15 percent by weight
Iron (Fe): balance.

It is preferred to properly predetermine the average perimeter of graphite contained in the cast iron in crystalline form, and the average perimeter of graphite may be in the range of 160–260 μm.

From another aspect of the present invention, there is provided a brake assembly comprising: a friction element containing a predetermined amount of steel fibres and having a hardness in the range of $H_RS$ 30-80 obtained by the Rockwell method of hardness testing; and a sliding element adapted to slideably contact with said friction element and made of a cast iron having a composition including:

Carbon Equivalent (CE): 4.3-4.9 percent by weight
Chromium (Cr): 0.25-0.5 percent by weight
Tin (Sn): 0.05-0.12 percent by weight
Manganese (Mn): 0.4-1.2 percent by weight
Phosphorus (P): 0-0.1 percent by weight
Sulfur (S): 0-0.15 percent by weight
Iron (Fe): balance.

From still another aspect of the present invention, there is provided a method of producing a cast-iron product comprising the steps of casting a cast iron having a composition including:

Carbon Equivalent (CE): 4.3-4.9 percent by weight
Chromium (Cr): 0.25-0.5 percent by weight
Tin (Sn): 0.05-0.12 percent by weight
Manganese (Mn): 0.4-1.2 percent by weight
Phosphorus (P): 0-0.1 percent by weight
Sulfur (S): 0-0.15 percent by weight
Iron (Fe): balance, releasing a mold at a temperature not less than $A_1$ allotropic transformation temperature, and cooling the cast iron at a relatively high cooling rate.

DETAILED DESCRIPTION OF THE INVENTION

Figure 1:
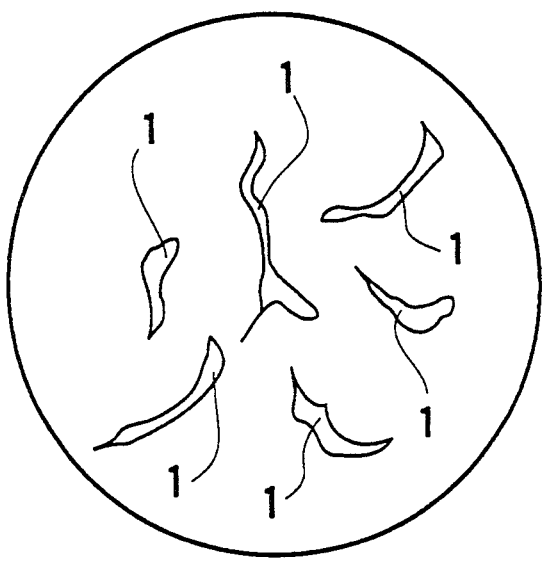
FIG. 1 is a schematic explanatory view showing a method for calculating the average perimeter of graphite in crystalline form within a cast iron with an image analysis system.

This invention will now be described in detail.

As set forth above, in accordance with the present invention, a cast-iron product has a composition comprising:

Carbon Equivalent (CE): 4.3-4.9 percent by weight
Chromium (Cr): 0.25-0.5 percent by weight
Tin (Sn): 0.05-0.12 percent by weight
Manganese (Mn): 0.4-1.2 percent by weight
Phosphorus (P): 0-0.1 percent by weight
Sulfur (S): 0-0.15 percent by weight
Iron (Fe): balance, and a brake assembly comprises a sliding element made of the cast iron, the sliding element being adapted to slideably contact with a friction element or elements constituting the assembly.

The CE is an important factor, upon which the amount of graphite in crystalline forms contained in a cast iron depends. When the CE is less than 4.3 wt. %, the cast iron possesses a vibration damping capacity substantially the same as the conventional one, so that a desired reduction in brake noise can not be obtained. It follows that this percentage (4.3 wt. %) of the CE is employed as the preferable lower limit thereof. On the other hand, when the CE is more than 4.9 wt. %, excessive amounts and sizes of graphite are crystallized and the strength of cast iron decreases significantly. Further, in this condition, it is difficult for the cast iron to impart sufficient matrix strength to itself and to ensure a desired wear-resistance thereof, even if an addition of alloying elements is made or a control of the cooling rate during casting are performed. Therefore, it is preferable to employ this percentage (4.9 wt. %) of the CE as the upper limit thereof.

Cr is an element which can prevent the production of ferrite and strengthen a pearlite matrix, as Sn described below. When the Cr content is less than 0.25 wt. %, sufficient strengthening effect on the pearlite matrix can not be achieved in the range of the relatively high CE, into which the range of the composition according to the present invention falls. Thus, this percentage (0.25 wt. %) is preferably employed as the lower limit of the Cr content. On the other hand, if the Cr content exceeds 0.5 wt. %, it leads to the excessive addition thereof to urge the production of white pig iron in cast iron and, therefore, this results in undesired machinability of the cast iron and promotion of wear in counterparts which come into sliding contact with the cast-iron product. Therefore, it is preferable to employ this percentage (0.5 wt. %) as the upper limit of the Cr content.

Sn is an element which can prevent the production of ferrite and strengthen a pearlite matrix, as well as the aforementioned Cr. When the Sn content is less than 0.05 wt. %, the pearlite matrix can not be strengthened enough. It follows that this percentage (0.05 wt. %) is preferably employed as the lower limit of the Sn content. On the other hand, when the Sn content exceeds 0.12 wt. %, this leads to promotion of embrittlement owing to the development of segregation and leads to a decrease of the vibration damping capacity owing to an excessive microstructural graphite profile. Thus, this percentage (0.12 wt. %) is preferably employed as the upper limit of the Sn content.

Mn is an indispensable element for the cast iron, which element effects deoxidation of cast iron. When the Mn content is less than 0.4 wt. %, the deoxidation effect can not appropriately obtained and further, growth of pearlite is restricted. In addition, it is difficult to ensure the desirable wear-resistance, that is, a desirable hardness and strength of cast iron. It follows that this percentage (0.4 wt. %) is preferably employed as the lower limit of the Mn content. On the other hand, when the Mn content exceeds 1.2 wt. %, there is a stronger tendency for the production of white pig iron to be urged. Since this tendency results in an excessive high strength of cast iron which would not provide an appropriate machinability of the cast iron, it is preferable to employ this percentage (1.2 wt. %) as the upper limit of the Mn content.

The P content is preferably so selected that the content does not exceed 0.10 wt. %. This is brought about because, if the content exceeds 0.10 wt. %, iron phosphide will be produced to make cast iron brittle. Therefore, this percentage (0.10 wt. %) is desirably employed as the upper limit of the P content.

S is an element which may harm graphite, and if the S content exceeds 0.15 wt. %, a desired profile of graphite will not be attained. Therefore, this percentage (0.15 wt. %) is preferably employed as the upper limit of the S content.

In a preferable embodiment, the average perimeter of graphite in crystalline form may be in the range of 160–260 μm.

Figure 2:
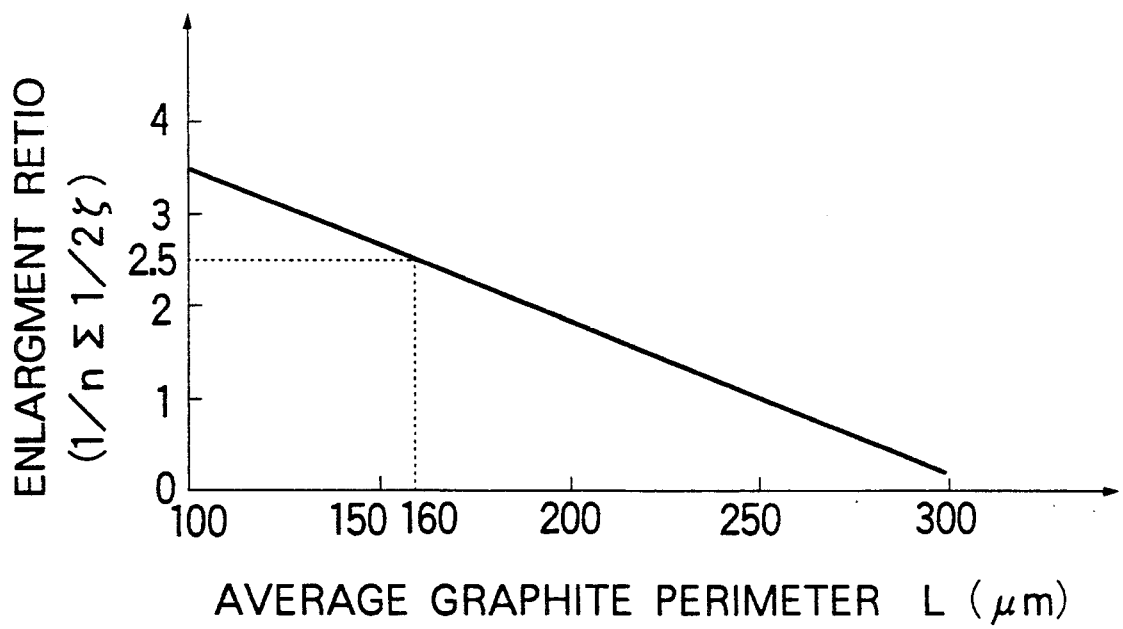
FIG. 2 is a graphical representation showing a relationship between the average perimeters of graphite and the vibration enlargement ratio.

As described above, the CE serves as a substitutive factor for representing the amount of graphite, but it can not completely represent the degree of vibration damping capacity of cast iron. We found that the coefficient of correlation between the CE and the vibration damping capacity was approximately 0.76, and researched any new factors being able to represent the correlation more effectively or highly. As a result, we found that the higher correlation coefficient, that is, approximately 0.90 can be obtained from the correlation between the average perimeter of graphite existing in a predetermined area within cast iron (referred to as the average graphite perimeter L hereinafter) and the damping capacity. The average graphite perimeter L is denoted by the following formula:

$$L = \Sigma L i / n$$

wherein Li (i=1,2,...n) is, as shown in FIG. 1, perimeters of graphite 1, 1, ... existing in a given area displayed with an image analysis system. Having investigated interrelationships between the average graphite perimeters L in cast iron products and vibration damping characteristics of brake disc plates constituted by the cast iron products, the damping characteristics were improved as the average graphite perimeters L (μm) were longer, as shown in FIG. 2, wherein the damping characteristics are represented by the enlargement or amplification ratio R of vibration. The enlargement ratio of vibration is denoted by the following equation:

$$R = \frac{1}{n} \times \Sigma \frac{1}{2\zeta}$$

wherein $\zeta$ is the damping ratio at each of 1 ... nth resonance points in an excitation test. Having performed a brake noise test regarding the above brake disc plates with a dynamo bench, we found that there was a high correlation between the result of the excitation tests and that of the brake noise tests. We, therefore, estimate the brake noise by the result of the excitation test. As shown in FIG. 2, in the range where the average graphite perimeters L were less than 160 μm, sufficient reducing effects on brake noise could not be obtained. Thus, we found that the perimeters L should not be less than 160 μm.

Figure 3:
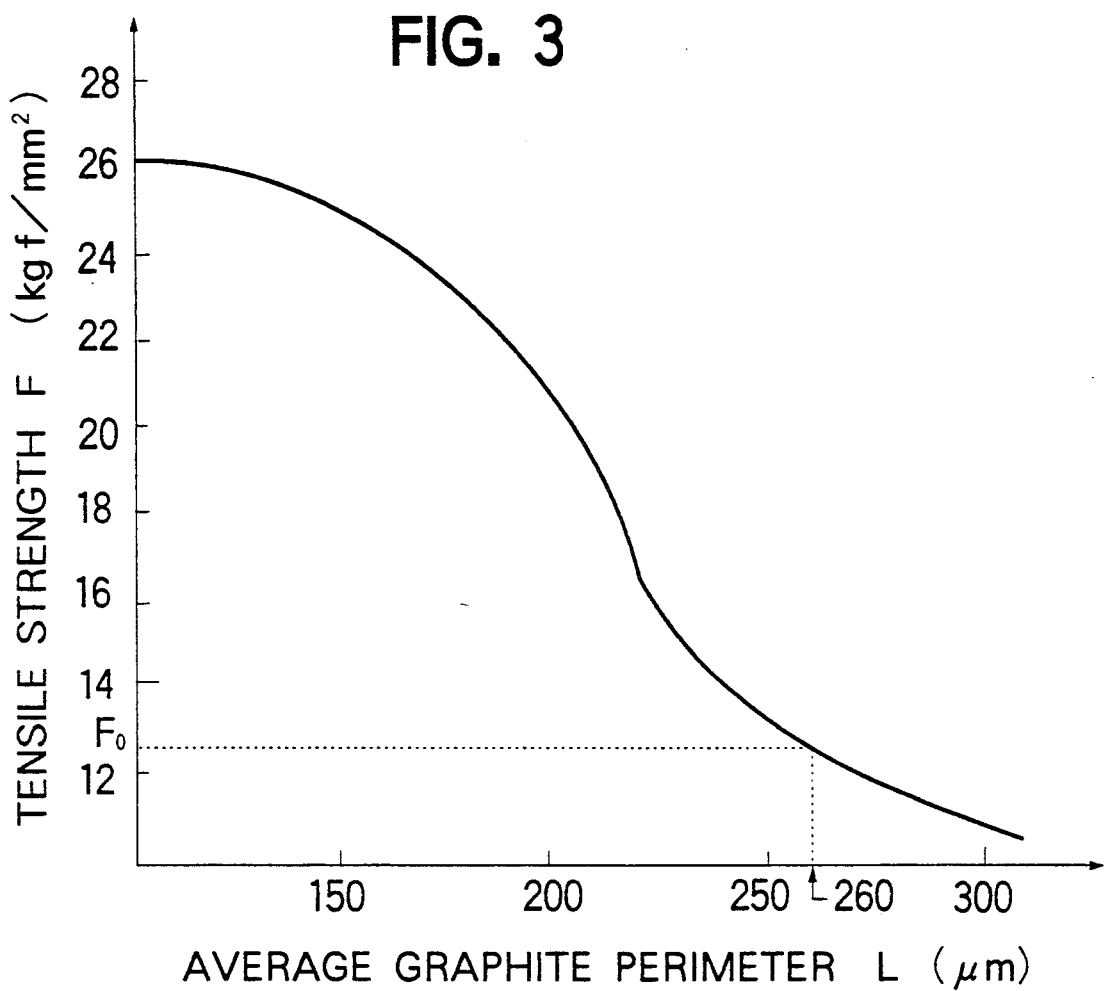
FIG. 3 is a graphical representation showing relationships between the average perimeters of graphite and the tensile strength of cast iron.

On the other hand, having investigated interrelationships between the average graphite perimeters L (μm) and the tensile strength F (kgf/mm²), the result as shown in FIG. 3 was obtained. According to the result, the tensile strength F was below the permissible tensile strength $F_o$ when the average graphite perimeters L exceeded 260 μm, and thus, we found that the perimeters L should not be more than 260 μm.

Embodiments of this invention will now be described below.

Each of the embodied examples in accordance with the present invention (referred to as, simply "Example" hereinafter) and Comparative Examples were made in a form of a brake disc plate in a respective process, in which a molten metal at 1380°–1400° C. was cast with a sand mold and then cooled. Table I below shows the composition (wt. %) of each of Examples and Comparative Examples, and the balance (not shown) was Fe and impurities.

TABLE I

|  | C.E | Cr | Sn | Mn | P | S |
|---|---|---|---|---|---|---|
| example 1 | 4.57 | 0.29 | 0.08 | 0.79 | 0.02 | 0.02 |
| example 2 | 4.75 | 0.42 | 0.10 | 0.67 | 0.03 | 0.03 |
| example 3 | 4.44 | 0.31 | 0.07 | 0.81 | 0.03 | 0.12 |
| example 4 | 4.63 | 0.32 | 0.07 | 0.72 | 0.03 | 0.04 |
| example 5 | 4.35 | 0.27 | 0.10 | 0.78 | 0.03 | 0.03 |
| example 6 | 4.56 | 0.35 | 0.088 | 0.79 | 0.02 | 0.02 |
| example 7 | 4.88 | 0.43 | 0.11 | 0.79 | 0.03 | 0.04 |
| comparative example 1 | 4.13 | 0.15 | — | 0.73 | 0.03 | 0.04 |
| comparative example 2 | 3.96 | 0.28 | 0.06 | 0.62 | 0.04 | 0.11 |
| comparative example 3 | 4.20 | 0.13 | — | 0.69 | 0.03 | 0.03 |
| comparative example 4 | 4.96 | 0.42 | 0.12 | 0.82 | 0.03 | 0.03 |

Regarding the above Examples and Comparative Examples, we mesured or investigated the hardness (Hv) obtained by the Vickers method of hardness testing, the Pearlite content (%), the average graphite perimeter L (μm), the tensile strength F (kgf/mm²) and the noise evaluation, and the results as shown in Table II below were given.

TABLE II

|  | hardness | pearlite content | average graphite perimeter | tensile strength | noise evaluation |
|---|---|---|---|---|---|
| example 1 | 198 | 100 | 189 | 21 | good |
| example 2 | 187 | 100 | 196 | 19 | good |
| example 3 | 210 | 100 | 175 | 24 | good |
| example 4 | 191 | 100 | 204 | 20 | good |
| example 5 | 222 | 100 | 168 | 26 | good |
| example 6 | 207 | 95 | 220 | 18 | good |
| example 7 | 165 | 95 | 260 | 13 | good |
| comparative example 1 | 214 | 100 | 126 | 25 | bad |
| comparative example 2 | 232 | 100 | 114 | 26 | bad |
| comparative example 3 | 179 | 90 | 142 | 21 | bad |
| comparative example 4 | 143 | 90 | 300 | 11 | good |

According to those results, it is apparent that the Examples 1–7 were excellent in the hardness, the pearlite content, the average graphite perimeter, the tensile strength and the noise evaluation, respectively. In contrast, the Comparative Examples 1–3 were shorter in the average graphite perimeter than the Examples 1–7, and the result of the evaluation of noise was insufficient. Further, the Comparative Example 4 was inadequate in the tensile strength, although the noise evaluation was sufficient.

As is apparent from the foregoing description, the CE appropriately selected CE and properly added alloying elements Cr and Sn allow the cast iron to effect an excellent vibration damping characteristics and to ensure a sufficient strength and hardness. Therefore, a sliding element, for example, a brake disc or drum, made of such a cast iron, has both an excellent vibration damping capacity and a sufficient wear-resistance.

In addition, provided the average perimeter of graphite is appropriately adjusted, the cast iron can have better vibration damping characteristics and better strength and hardness. This allows the sliding element, made of cast iron, to have an even more excellent vibration damping capacity and a more sufficient wear-resistance.

Figure 4:
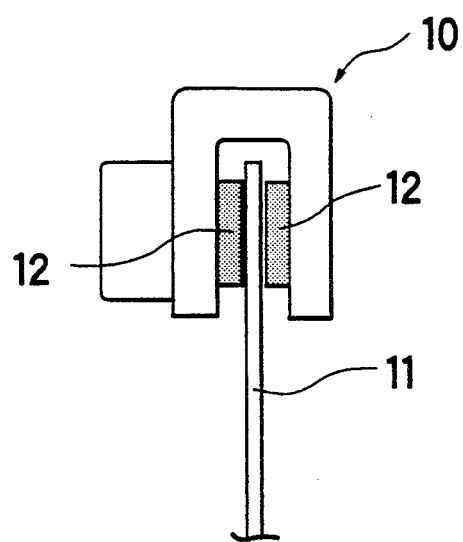
FIG. 4 shows a schematic partial elevational view of a disc brake in accordance with the present invention.

Referring to FIG. 4, there is shown a disc brake assembly 10 comprising a sliding element, namely a brake disc or disc rotor 11 and friction elements, namely brake pads 12. The disc brake assembly 10 defines a disc brake for a vehicle in which the brake pads 12 are arranged in a brake caliper generally shown in FIG. 4. The brake disc 11 is adapted to be secured to a vehicle wheel (not shown).

Five Examples and Comparative Examples of the brake disc 11 having the compositions (wt %) shown in Table III below were provided for tests, respectively. Those discs were produced by casting a molten metal at 1380°-1400° C. with sand molds and then cooling it. In Table III, the balance is Fe and impurities.

TABLE III

|  | C.E | Cr | Sn | Mn | P | S |
|---|---|---|---|---|---|---|
| example 11 | 4.57 | 0.29 | 0.08 | 0.79 | 0.02 | 0.02 |
| example 12 | 4.63 | 0.32 | 0.07 | 0.72 | 0.03 | 0.04 |
| example 13 | 4.75 | 0.42 | 0.10 | 0.67 | 0.03 | 0.03 |
| comparative example 11 | 3.96 | 0.28 | 0.06 | 0.62 | 0.04 | 0.11 |
| comparative example 12 | 4.13 | 0.15 | — | 0.73 | 0.03 | 0.04 |

Further, brake pads having the compositions shown in Table IV were provided for the tests.

TABLE IV (unit: vol. %)

|  | semi-metalic |  | non-metalic (A) |  | non-metalic (B) |  | asbestos |  |
|---|---|---|---|---|---|---|---|---|
| reinforement | steel fiber | 15 | brass aramid fiber | 10 5 | calcium meta-silicate glass-wool | 30 10 | asbestos | 40 |
| graphite |  | 20 |  | 20 |  | 15 |  | 10 |
| filler | inorganic filler | 40 | inorganic filler | 40 | inorganic filler | 20 | inorganic filler metallic powder | 25 |
| modifier |  | 5 |  | 5 |  | 5 |  | 5 |
| phenolic resin |  | 20 |  | 20 |  | 20 |  | 20 |

Figure 5:
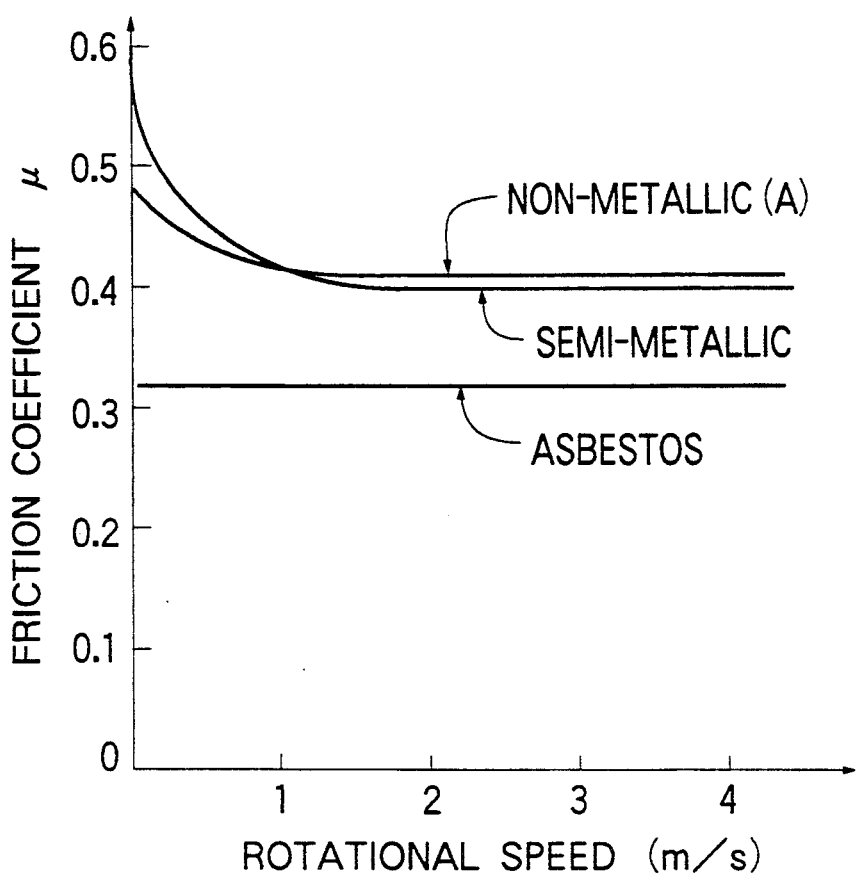
FIGS. 5 and 6 are graphical representations showing relationships between the coefficients of friction and the rotational speeds of brake discs in brake assemblies, in accordance with the present invention and the conventional construction respectively.
Figure 6:
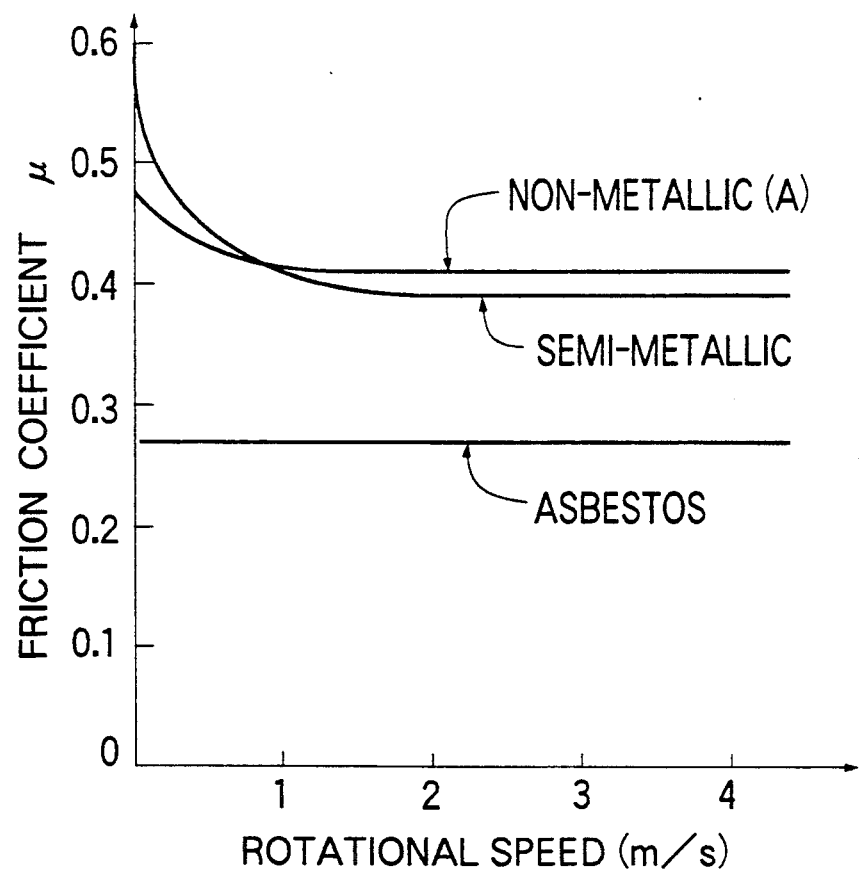

FIG. 5 shows relationships between the coefficient of friction and the rotational speed of the disc in brake assemblies, each of the assemblies having the disc of Comparative Example 12 combined with the semi-metallic, non-metalic or asbestos pad. FIG. 6 shows relationships therebetween in brake assemblies, each of the assemblies comprising the disc of Example 11 combined with the semi-metallic, non-metallic and asbestos pad.

As shown in FIGS. 5 and 6, the brake assemblies using the asbestos pads failed in the coefficient of friction, regardless of whether the assembly used the disc of Example 11 or the disc of Comparative Example 12, and, therefore, failed in providing a satisfactory braking force.

The brake assemblies using semi-metallic pads effected a sufficient coefficient of friction respectively and, therefore, their braking forces were desirable. However, the brake assembly using the pad of Comparative Example 12 produced undesirable brake noise. On the other hand, the brake assembly using the pad of Example 11 did not produce such undesirable noise, although the friction coefficient was increased in the zone of relatively low rotational speed and the brake assembly was under a condition in which undesirable brake noise might occur. This is brought about because the disc has been made of the cast iron excellent in the vibration damping capacity, i.e., the cast iron of Example 11.

In cases of the brake assemblies which used the non-metallic pads having the composition shown in Table IV, non-metallic (A), the assembly comprising the disc of Comparative Example 12 produced undesirable brake noise, whilst the assembly comprising the disc of Example 11 did not produce such brake noise. This is due to the same reason as the above case as for the assembly using the semi-metallic pad.

The brake discs of Examples 11-13 and Comparative example 11, 12 shown in Table V were selectively combined with the four types of brake pad shown in Table IV, and the brake systems thus assembled were placed under the tests for the braking force and the frequency of noise occurance. The results obtained by the tests are shown in Table V below.

TABLE V

| Disk | Pad | Braking force | Frequency of noise occurance |
|---|---|---|---|
| example 11 | semi-metallic | OK | few |
|  | non-metallic (A) | OK | few |
|  | non-metallic (B) | OK | few |
|  | asbestos | NG | few |
| example 12 | semi-metallic | OK | few |
| example 13 | semi-metallic | OK | few |
| comparative example 11 | asbestos | OK | few |
| comparative example 12 | semi-metallic | OK | many |
|  | non-metallic (A) | OK | many |
|  | asbestos | NG | few |

As indicated in this Table V, we found that the brake assemblies having the brake discs of Example 11-13 and the brake pad made of non-asbestos materials effected both the excellent braking force and the desirable frequency of noise occurance. Although the brake assembly having the brake disc of Comparative Example 11 and the asbestos brake pad effected both the excellent braking force and the desired frequency of noise occurence, it is not acceptable to use asbestos as a material of the friction element from a view of the recent tendency wherein the asbestos should not be used for any materials. Further, the brake assembly having the brake disc of Comparative Example 12 and the asbestos brake pad was insufficient both in the selection of material of the friction element and the braking force. Still further, the brake assembly having a brake disc of Comparative Example 12 and a brake disc of semi-metallic or non-metallic (A) was insufficient in the frequency of noise occurence.

Materials of the friction elements (i.e. the brake pads) are not limited to the above Table IV. Materials including non-asbestos reinforcement such as brass, aramid fiber, glass-wool, or calcium meta-silicate, in the range of 10–40 vol. % and possessing the hardness of $H_RS$ 30–80 obtained by the Rockwell method of hardness testing, may be used for the friction elements. When the content of reinforcement was below 10 vol. %, the coefficient of friction between the friction element and the sliding element (i.e., brake disc) became insufficient. When the content exceeded 40 vol. %, the hardness of the friction element excessively rose so that seizing might be induced between the friction and sliding elements. Therefore, the above range of the reinforcement content and hardness, i.e., the content of 10–40 vol. % and the hardness of $H_RS$ 30–80 are preferably employed for the friction element.

In the embodiment, the disc brake has been described, but instead thereof, this invention can be applied to a drum brake for a vehicle which has friction elements and a sliding element, the friction element consitituting a brake shoe which is adapted for limiting the rotation of the sliding element, the sliding element constituting a brake drum which is adapted to be secured to a vehicle wheel.

Although the specific embodiments have been described, the brake assembly in accordance with the present invention comprises a friction element and a sliding element, and the friction element contains a predetermined amount of steel fibers and has the hardness in the range of $H_RS$ 30–80, and further, the sliding element being made of a cast iron in which the CE is appropriately selected and to which alloying elements Cr and Sn is properly added.

The brake assembly thus arranged can ensure the coefficient of friction enough to obtain the sufficient braking force and allows the frequency of braks noise occurance to decrease effectively, and this leads to a provision of a brake system having a good performance and achieving a substantial reduction of brake noise.

According to another aspect of the present invention, the method of producing a cast iron product comprising the steps of casting a cast iron having a composition including:

Carbon Equivalent (CE): 4.3–4.9 percent by weight
Chromium (Cr): 0.25–0.5 percent by weight
Tin (Sn): 0.05–0.12 percent by weight
Manganese (Mn): 0.4–1.2 percent by weight
Phosphorus (P): 0–0.1 percent by weight
Sulfur (S): 0–0.15 percent by weight
Iron (Fe): balance, releasing a mold at a temperature not less than $A_1$ allotropic transformation temperature, and cooling said cast iron at a relatively high cooling rate.

As apparent from the foregoing description, the higher CE allows a cast iron to obtain a more excellent vibration damping capacity, but conversely, this induces a lower strength and hardness of cast iron. To prevent such low strength and hardness, the cooling rate of cast iron around $A_1$ allotropic transformation temperature is increased to the rate substantially higher than that of a normal process. In order to increase the cooling rate, the mold is released at a temperature higher than $A_1$ allotropic transformation temperature and around this $A_1$ temperature, the cast iron is cooled with mist.

$A_1$ allotropic transformation temperature is enhanced as the CE is increased, and $Ar_1$ transformation begins at approximately 740° C. in the cast iron having the above composition. Therefore, at a temperature higher than this temperature, the mold is released and then, the cast iron is forced to be cooled, at least down to the temperature at which $Ar_1$ transformation ends, that is, down to around 700° C.

The preferable method of cooling the cast iron is a cooling with mist rather than a cooling by air, because such a cooling retards precipitation of ferrite and allows pearlite structure to be strengthened, thereby ensuring desired strength and hardness of the cast iron. The mist is generated by air and water. It is important to atomize the mist uniformly on the whole surface of the cast iron. Non-uniform atomization should be avoided because it causes irregular distribution of the hardness. Further, a cooling from an excessive high temperature should be avoided because it causes a high residual stress which may induce cracks. Still further, excessive cooling with mist should be avoided because it causes martensite structure or the like.

In the actual cooling process at which the cooling rate depends on the size and profile of the cast iron, it is necessary to predetermine an optimal condition relative to the respective cast iron. For example, in a case of a brake member of a an automobile, the release of mold may be performed approximately 10–25 minutes after the casting has been finished, and the volume rate of mist for cooling may be approximately 50–800 cm³/min.

An embodiment of the method according to the present invention will be described hereinafter.

In this embodiment of the present method, a molten metal at 1380°–1400° C.; having the above composition; is cast with a sand mold. Then, the mold is destroyed at a temperature of approximately 800° C. higher than the $A_1$ allotropic transformation temperature. Thereafter, the cast iron is cooled across the $A_1$ allotropic transformation temperature by a forcible cooling, such as an atomizing or spraying.

As an example, explanation below is made as for a cast iron having the composition shown in the above Table I, Example 6.

Figure 7:
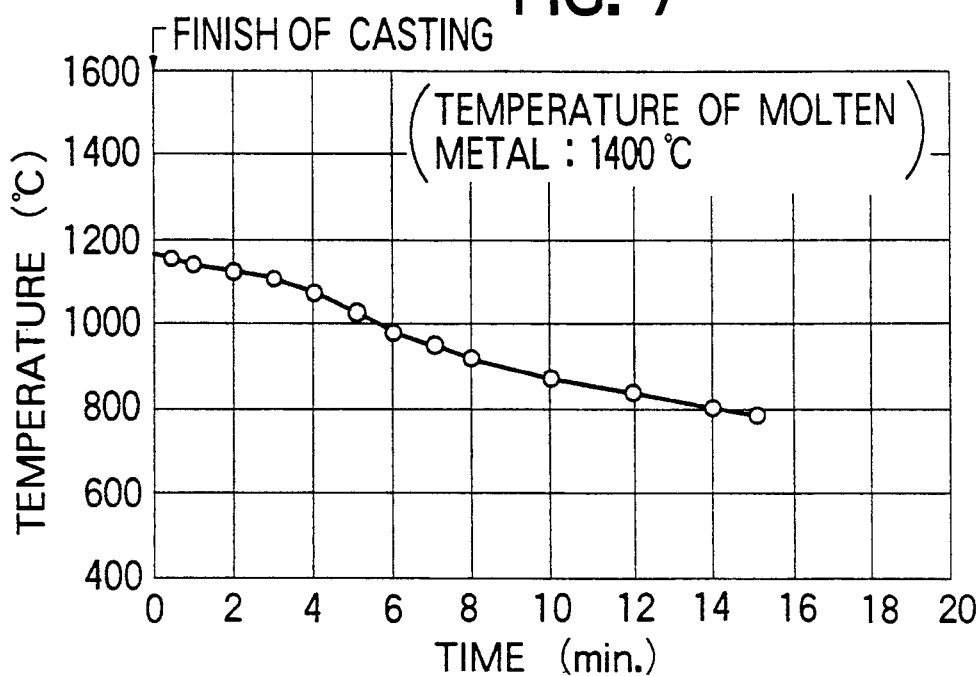
FIG. 7 is a graphical representation showing variations in the temperature of cast iron during cooling.

FIG. 7 shows the cooling curve of the cast iron having that composition, and the cast iron has been used to produce a Front Ventilated Disc Plate which is adapted to be arranged in a ventilated type disc brake of a front wheel in a vehicle.

Table IV below shows the hardness ($H_v$) of six examples, which differ in the timing for releasing the mold and in the cooling method used. Each of the selected timings was 10, 15 and 25 minutes after the respective casting had been finished. Further, the mist was applied to the cast iron at the rate of 300 cm³/min.

TABLE VI

| Timing for releasing mold | cooling with mist (H.) | cooling without mist (H.) |
|---|---|---|
| 10 min | 212 | 179 |
| 15 min | 207 | 174 |
| 25 min | 170 | 170 |

As shown in Table VI, the hardness is not enhanced in a case where the cast iron was cooled without mist. Further, the hardness is not enhanced in spite of the cooling with mist in a case where the mold was released at 25 minutes after casting, that is, the mold was released at a temperature below $A_1$ allotropic transformation temperature. Therefore, in order to enhance the hardness, it is apparent that it is required to release the mold at a temperature not less than $A_1$ allotropic transformation temperature and to forcibly cool the cast iron.

Figure 8:
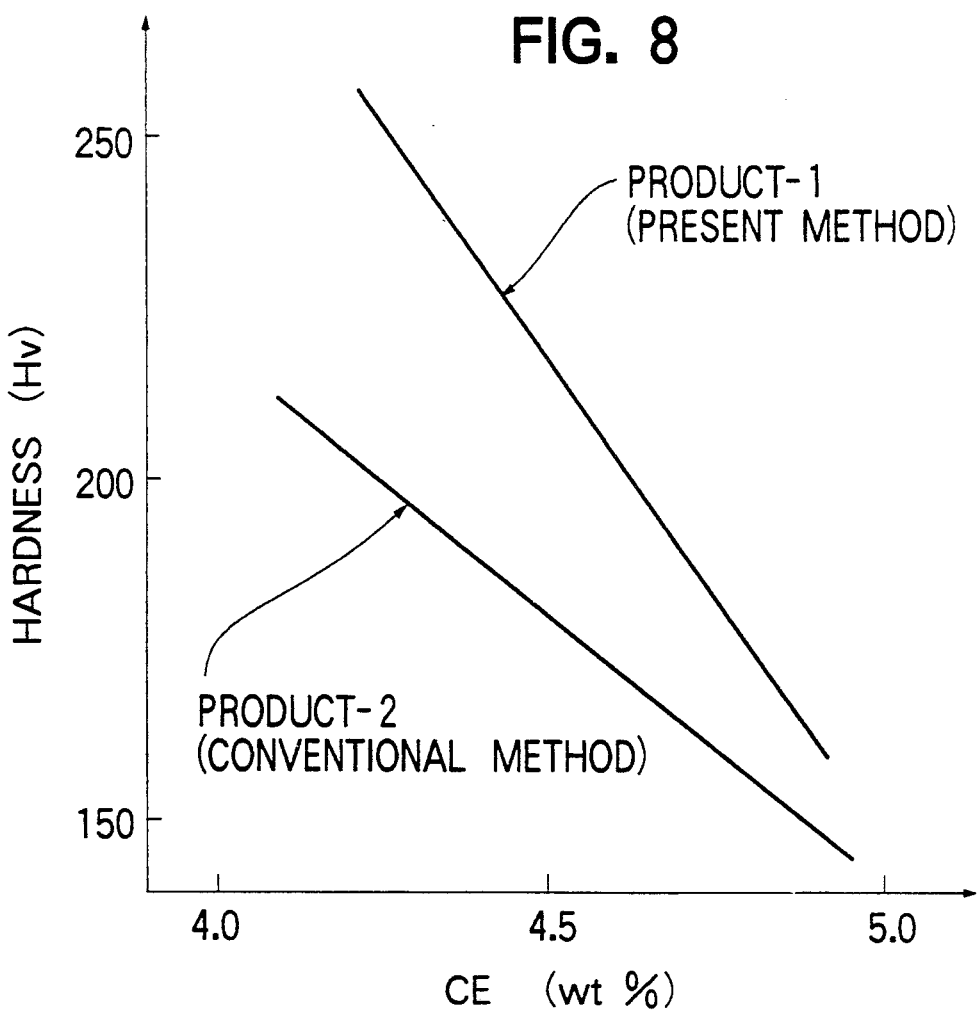
FIG. 8 is a graphical representation showing variations in the hardness of cast iron in accordance with the present invention, in comparison with variations in the hardness of conventional cast iron.

As will be understood from the description above, the present method comprises the steps of casting a cast iron to which alloying elements Cr and Sn are appropriately added, thereafter releasing molds at the temperature not less than $A_1$ allotropic transformation temperature, and then, forcibly cooling the cast iron, whereby the adequate size of crystallized graphite can be ensured so as to achive the appropriate graphite perimeter L in the range of 160-260 μm and the production of ferrite can be retarded. As for the hardness (Hv) relative to the CE (wt %), we investigated a cast-iron product (product-1) produced by the present method and a cast-iron product (product-2) produced by a conventional method in which a cast iron having the same composition as the product-1 was cast and thereafter gradually cooled. As a result, we found that the product-1 produced by the present method developed a considerably high hardness in contrast with the product-2 produced by the conventional method, as shown in FIG. 8. This results apparently from that the production of ferrite was retarded.

Thus, the present method allows a cast-iron product, such as a brake disc or brake drum, to be efficiently produced so that the product possesses an excellent vibration damping capacity and a desirable wear-resistance.

The present invention has thus been shown and described with reference to specific embodiments. However, it should be noted that the present invention is in no way limited to the details of the described arrangement but changes and modifications may be made without departing from the scope of the appended claims.

We claim:

1. A process for producing a graphite containing cast-iron product comprising the steps of:
   providing an iron composition consisting essentially of 4.3-4.9 percent by weight carbon equivalent, 0.25-0.5 percent by weight chromium, 0.05-0.12 percent by weight tin, 0.4-1.2 percent by weight manganese, 0-0.1 percent by weight phosphorus, 0-0.15 percent by weight sulfur, and the balance iron;
   casting the iron composition in a mold;
   releasing the iron composition from the mold when it is at a first temperature not less than an $A_1$ allotropic transformation temperature;
   generating a mist of gas and liquid; and
   applying the mist to said iron composition to cool the iron composition at a high cooling rate and reduce its temperature from said first temperature to a second temperature below the $A_1$ allotropic transformation temperature.

2. A process according to claim 1, wherein said mist is generated from air and water.

3. A process according to claim 1, wherein said mist is generated at a volume rate which is in the range of 50 $cm^3$/min to 800 $cm^3$/min.

4. A process according to claim 1, wherein said iron composition is released from the mold less than 25 minutes after casting of the iron composition in the mold has been finished.

5. A process according to claim 1, wherein the casting step occurs when the iron composition is a molten metal at a temperature of 1380° C. to 1400° C.

6. A process according to claim 1, wherein said iron composition is released from said mold at a temperature of approximately 800° C.

7. A process according to claim 1, wherein said mold is a sand mold.

8. A process according to claim 1, wherein said iron composition is cooled until $Ar_1$ transformation ends.

9. A process according to claim 1, wherein said iron composition is cooled until the temperature of said iron composition decreases to approximately 700° C.

* * * * *